3,320,256
FLUORINATED IMIDAZO[1,2-c]PYRIMIDINES AND PYRIMIDO[1,2-c]PYRIMIDINES
Robert Duschinsky, Essex Fells, and Thomas Francis Gabriel, West Paterson, N.J., assignors to Hoffmann-La Roche Inc., Nutley, N.J., a corporation of New Jersey
No Drawing. Filed Apr. 9, 1965, Ser. No. 447,050
9 Claims. (Cl. 260—256.4)

The present invention relates to a new class of fluorinated, fused ring compounds and to novel fluorinated pyrimidines which are useful as intermediates in the preparation thereof and to processes for preparing these novel compounds. More particularly, this invention relates to fluorinated imidazopyrimidines and fluorinated pyrimidopyrimidines of the formula $$\text{(I)}$$

wherein $R_1$ is an alkylene radical of two or three carbon atoms or such an alkylene radical in which one or more of the hydrogen atoms has been replaced by a lower alkyl group; and $R_2$ is hydrogen, lower alkyl, hydroxy lower alkyl, halogeno-lower alkyl or lower alkoxy lower alkyl and pharmaceutically acceptable salts thereof. More specifically, the novel end products of this invention can be represented by the formulae $$\text{(II)} \quad \text{(III)}$$

wherein $R_2$ has the same significance as above and R is hydrogen or lower alkyl. Those compounds wherein $R_2$ is hydrogen are tautomeric. All such tautomeric forms are encompassed by this invention.

The novel end products of this invention, i.e., the compounds of Formulae I, II and III above, are prepared by first reacting 2,4-dichloro-5-fluoropyrimidine with an amino alcohol of the formula $$\text{HN}\begin{matrix}R_1\text{—OH}\\R_3\end{matrix} \quad \text{(IV)}$$

wherein $R_1$ has the same significance as above. Thus, the group —$R_1$—OH can represent a lower hydroxy alkyl radical such as β-hydroxy ethyl, α-lower alkyl-β-hydroxy ethyl, γ-hydroxy propyl and the like. $R_3$ represents hydrogen, lower alkyl, hydroxy lower alkyl or lower alkoxy lower alkyl.

By this reaction there are formed the intermediates of the formula $$\text{HO—}R_1\text{—N—}R_3$$

$$\text{(V)}$$

wherein $R_1$ and $R_3$ have the same significance as above.
The compounds of Formula V can then be ring closed to the condensed ring systems of Formulae I, II and III above wherein $R_2$ is hydrogen, lower alkyl, hydroxy lower alkyl or lower alkoxy lower alkyl. Alternatively, compounds of Formula V wherein $R_3$ is lower hydroxy alkyl can be halogenated and then cyclized to the fused ring compounds of Formulae I, II and III wherein $R_2$ is halogeno-lower alkyl. The halogenated compounds of Formula V can be represented by the formula $$\text{Cl—}R_1\text{—N—}R_3$$

$$\text{(VI)}$$

wherein $R_1$ and $R_3$ have the same significance as above.
The terms "halo," "halogen" and "halogeno" as used throughout this application connote the middle halogens, i.e., bromine and chlorine. The term "lower alkyl" is used to indicate saturated aliphatic hydrocarbons of 1–6 carbon atoms which can be either straight or branched chain such as methyl, ethyl, propyl, isopropyl and the like. The 2,4-dichloro-5-fluoropyrimidine starting material is a known compound prepared by methods known to the art.

The reaction of 2,4-dichloro-5-fluoropyrimidine with an amino alcohol of Formula III is preferably carried out in an inert organic solvent such as, for example, chloroform, dioxane, acetone, diethyl ketone, methyl ethyl ketone and the like, and is preferably carried out in the presence of an acid acceptor which will take up the HCl formed in the reaction. Suitable acid acceptors are, for example, tertiary organic bases such as triethylamine, tributylamine, dimethylaniline and the like. The reaction is suitably carried out at room temperature, though higher or lower temperatures can also be used. Preferably, the reaction is carried out at a temperature between about 0° C. and the boiling point of the reaction mixture.

In one embodiment of the invention the reaction with amino alcohol is carried out by the slow addition of the appropriate amino alcohol to a solution of 2,4-dichloro-5-fluoropyrimidine in acetone followed by the slow addition of triethylamine. The slow addition of amino alcohol and triethylamine is preferably accomplished by a dropwise addition. The mixture is heated for about 1–3 hours and cooled in order to precipitate the solid triethylamine chloride which is separated by filtration.

The cyclization reaction is suitably carried out by simply heating the appropriate compound of Formula II in an acidic solution. Any strong acid can be used but mineral acids such as HCl, $H_2SO_4$ and the like are preferred. In the case of compounds of Formula II wherein $R_2$ is hydrogen, the cyclization reaction is advantageously carried out in the presence of thionyl chloride in lieu of a mineral acid.

The compounds of Formula VI wherein $R_3$ is halo lower alkyl are prepared by halogenating, preferably chlorinating, the corresponding compound of Formula V wherein $R_3$ is lower hydroxy alkyl. The chlorination is suitably effected by heating a solution of the latter compound in the presence of thionyl chloride. As solvent there can be employed organic solvents such as chloroform, etc. The compounds of Formula I wherein $R_2$ is halo lower alkyl are prepared by ring closure of the appropriate chlorinated compounds described above to form compounds of the formula $$\text{(VII)}$$

wherein $R_1$ has the same significance as above followed by acid hydrolysis. The compounds of Formula VII are also novel and thus constitute part of this invention.

The novel compounds of this invention which are obtained as salts may be converted into their free base form by neutralizing with a suitable base.

The novel compounds of this invention are useful as antiviral agents. More particularly, they are useful as prophylactic agents and chemotherapeutic drugs for the treatment of viral infections and diseases. They are particularly useful in the treatment of diseases caused by Columbia SK and herpetic viruses, e.g., herpes simplex. Compounds of Formula II and the imidazopyrimidines of Formula VII are particularly effective antiviral agents and therefore constitute a preferred group. The compounds of this invention can be administered either orally or parenterally with dosage adjusted to individual needs. They can be administered in the free form or in the form of their salts or in admixture with conventional pharmaceutical carriers.

The invention will be more fully understood from the examples which follow. All temperatures are stated in degrees centigrade and all melting points are corrected.

EXAMPLE 1

*Preparation of 2-[N-methyl-(2-chloro-5-fluoro-4-pyrimidinylamino)]ethanol*

To a solution of 57.63 g. (0.345 mole) of 2,4-dichloro-5-fluoropyrimidine in 300 ml. of acetone, there was added dropwise 28.2 g. (0.375 mole) of methylaminoethanol, followed by 40.0 g. (0.400 mole) of triethylamine, also dropwise. The resulting suspension was refluxed with stirring for 2½ hours; and then cooled in ice. The solid was removed by filtration and washed well with acetone. The filtrate and washings were evaporated in vacuo to a yellowish solid. The crude 2-[N-methyl-(2-chloro-5-fluoro-4-pyrimidinylamino)]ethanol thus obtained melted at 66–68.5°. Recrystallization from acetone raised the melting point to 75–77°.

EXAMPLE 2

*Preparation of 3-[(2-chloro-5-fluoro-4-pyrimidinyl)(2-hydroxyethyl)amino]-1-propanol*

To a solution of 56 g. (0.335 mole) of 2,4-dichloro-5-fluoropyrimidine in 200 ml. of acetone there was added dropwise 44 g. (0.370 mole) of (3-hydroxypropyl)(2-hydroxyethyl)amine, followed by 40.8 g. (0.408 mole) of triethylamine. The resulting hot suspension was heated to reflux. After 2 hours at reflux temperature the suspension was cooled to room temperature and kept at that temperature for 72 hours. The solid material was removed by filtration and washed well with acetone. The combined filtrate and washings were evaporated to a tan solid, dissolved in 100 ml. of hot water, clarified by filtration through charcoal and Celite, and cooled in ice. The resulting crystals were removed by filtration, washed with water and dried in vacuo. The crude 3-[(2-chloro-5-fluoro-4-pyrimidinyl)(2-hydroxyethyl)amino]-1-propanol thus obtained melted at 79–81°. After recrystallization from acetone the white crystalline product melted at 104–106°.

EXAMPLE 3

*Preparation of 2-[N-ethyl-(2-chloro-5-fluoro-4-pyrimidinylamino)]ethanol*

To a solution of 69.58 g. (0.417 mole) of 2,4-dichloro-5-fluoropyrimidine in 300 ml. of acetone, there was added dropwise 41 g. (0.46 mole) of ethylaminoethanol followed by 56.7 g. (0.567 mole) of triethylamine, also dropwise. The resulting hot suspension was heated to reflux. After 2 hours at reflux temperature, the mixture was cooled slowly to room temperature and stirred overnight. The solid was removed by filtration and washed well with acetone. The combined filtrate and washings were concentrated in vacuo to a thick syrup which crystallized after standing for several days in the refrigerator. This crude 2-[N-ethyl-(2-chloro-5-fluoro-4-pyrimidinyl-amino)]ethanol melted at 45–51°. The crude material was triturated with 100 ml. of water, filtered and dried in vacuo over H₂SO₄. The pure product thus obtained melted at 48–52°.

EXAMPLE 4

*Preparation of 2-chloro-4-bis(2-methoxyethyl)amino-5-fluoropyrimidine*

To a solution of 58.3 g. (0.349 mole) of 2,4-dichloro-5-fluoropyrimidine in 300 ml. of acetone there was added dropwise 53.2 g. (0.400 mole) of bis-β-methoxyethylamine, followed by 45 g. (0.450 mole) of triethylamine, also dropwise. The resulting suspension was heated to reflux. After 2 hours at reflux temperature, the suspension was cooled to room temperature and stirred for 4 hours. The solid was removed by filtration and washed well with acetone. The combined filtrate and washings were concentrated to a thick yellow syrup which crystallized upon standing in the refrigerator overnight. This soft odorous yellow solid was slurried with 200 ml. of water, filtered, washed with water and dried in vacuo over H₂SO₄ at room temperature. The pure crystalline 2-chloro-4-bis(2-methoxyethyl)amino-5-fluoropyrimidine thus obtained melted at 44.5–46.5°.

EXAMPLE 5

*Preparation of 2-chloro-4-bis(2hydroxyethyl)amino-5-fluoropyrimidine*

To a solution of 38.55 g. (0.231 mole) of 2,4-dichloro-5-fluoropyrimidine in 125 ml. of acetone, there was added dropwise 27.3 g. (0.260 mole) of diethanolamine, followed by 30 g. (0.300 mole) of triethylamine, also dropwise. The resulting hot suspension was heated to reflux. After 2 hours at reflux temperature, the mixture was cooled to room temperature. The solid was removed by filtration and washed well with acetone. The combined filtrate and washings were concentrated in vacuo to a syrup. Repeated trituration with 5 percent methanol in ether resulted in the isolation of crude 2-chloro-5-bis(2-hydroxyethyl)amino-5-fluoropyrimidine melting at 68–78°. Further crops were isolated from the ether extracts. Pure crystalline 2-chloro-4-bis(2-hydroxyethyl)amino-5-fluoropyrimidine melting at 86–88° was isolated by recrystallization from methanol-ether.

EXAMPLE 6

*Preparation of 2-chloro-4-(2-hydroxyethyl)amino-5-fluoropyrimidine*

To a solution of 46.62 g. (0.279 mole) of 2,4-dichloro-5-fluoropyrimidine in 400 ml. of acetone there was added dropwise a solution of 18.2 g. (0.297 mole) of ethanolamine in 40 ml. of acetone, followed by 58.2 g. (0.575 mole) of triethylamine. The resulting suspension was heated to reflux. After 2 hours at reflux temperature, the suspension was cooled to room temperature and stirred overnight. The solid was removed by filtration, washed with acetone and dried in vacuo at 60°. This crude mixture of triethylammonium chloride and 2-chloro-4-(2-hydroxyethyl)amino-5-fluoropyrimidine was recrystallized from 155 ml. of boiling water. The resulting pure 2-chloro-4-(2-hydroxyethyl)amino-5-fluoropyrimidine melted at 151–152°.

EXAMPLE 7

*Preparation of 2-chloro-4-(3-hydroxypropyl)amino-5-fluoropyrimidine*

To a solution of 44 g. (0.263 mole) of 2,4-dichloro-5-fluoropyrimidine in 400 ml. of acetone, there was added dropwise 22.5 ml. (0.30 mole) of 3-aminopropanol, followed by 75 ml. (0.525 mole) of triethylamine, also dropwise. The resulting suspension was heated to reflux. After 2 hours at reflux temperature, the suspension was cooled slowly to room temperature and stirred overnight.

The solid was removed by filtration, washed well with acetone and the combined filtrate and washings evaporated to a brown solid. This crude 2-chloro-4-(3-hydroxypropyl)amino-5-fluoropyrimidine was extracted once with ether and then recrystallized from water. The pure 2-chloro - 4 - (3 - hydroxypropyl)amino-5-fluoropyrimidine thus obtained melted at 118°–120°.

EXAMPLE 8

*Preparation of 2-chloro-4-(1-methyl-2-hydroxyethyl) amino-5-fluoropyrimidine*

To a solution of 43 g. (0.257 mole) of 2,4-dichloro-5-fluoropyrimidine in 300 ml. of acetone, there was added 16.7 g. (0.45 mole) of 2-amino-1-propanol, followed by 34 g. (0.34 mole) of triethylamine. The resulting warm yellow solution was refluxed with stirring for 2 hours and then cooled to room temperature. The solid which crystallized out was removed by filtration and washed well with acetone. The combined filtrate and washings were concentrated until heavy crystallization occurred. The solid was removed by filtration, washed with acetone and dried in vacuo at 60°. The crude 2-chloro-4-(1-methyl - 2 - hydroxyethyl)amino-5-fluoropyrimidine thus isolated melted at 121–132°. A second crop was obtained by evaporation of the mother liquor followed by ether trituration of the resulting syrup. The two crude materials were recrystallized separately from boiling water. The resulting pure product melted at 144–146°.

EXAMPLE 9

*Preparation of 2-chloro-4-(3-chloropropyl)amino-5-fluoropyrimidine hydrochloride*

A suspension of 20 g. (0.126 mole) of 2-chloro-4-(3-hydroxypropyl)amino-5-fluoropyrimidine in a mixture of 350 ml. of thionyl chloride and 250 ml. of chloroform was refluxed for 8 hours, then kept at room temperature overnight. The solid was removed by filtration and washed well with chloroform and ether. The combined filtrate and washings were evaporated to dryness, extracted with boiling 2B alcohol and the extract cooled in ice. The resulting suspension was filtered and the solid washed with ether. The crude 2-chloro-4-(3-chloropropyl)amino-5-fluoropyrimidine hydrochloride thus isolated melted at 287–288° with decomposition. Recrystallization from ethanol gave pure product, M.P. 287° dec.

EXAMPLE 10

*Preparation of 1-ethyl-8-fluoro-2,3-dihydroimidazo-[1,2-c]pyrimidin-5-[1H]-one hydrochloride*

A solution of 20 g. (0.0912 mole) of 2-[N-ethyl-(2-chloro-5-fluoro-4-pyrimidinylamino)]ethanol in 100 ml. of concentrated hydrochloric acid was refluxed for 2½ hours. The solution was then concentrated in vacuo to a syrup. The addition of 20 ml. of 2B alcohol to this syrup caused crystallization. The solid was removed by filtration and washed well with alcohol. The combined mother liquor and washings were evaporated again to a syrup. Trituration with pyridine caused crystallization. The solid was removed by filtration and washed well with pyridine and ether. The crude 1-ethyl-8-fluoro-2,3-dihydroimidazo[1,2 - c]pyrimidin - 5-[1H]-one hydrochloride thus isolated melted at 226–228°. A second crop was obtained by cooling the mother liquor to −10°. The combined crude materials were recrystallized from 100 ml. of isopropyl alcohol. The pure 1-ethyl-8-fluoro-2,3-dihydroimidazo[1,2 - c]pyrimidin-5-[1H]-one hydrochloride thus obtained melted at 227–228.5°.

EXAMPLE 11

*Preparation of 6-chloro-3,4-dihydro-9-fluoro-2H-pyrimido[1,2-c]pyrimidine hydrochloride*

A suspension of 10 g. (0.0487 mole) of 2-chloro-4-(3-hydroxypropyl)amino-5-fluoropyrimidine in 50 ml. of thionyl chloride was diluted with 100 ml. of chloroform and heated to reflux. After 7 hours at reflux temperature, the thick slurry was cooled to room temperature and allowed to stand overnight. The solid was removed by filtration and washed well with chloroform. The crude 6-chloro-3,4-dihydro-9-fluoro-2H-pyrimido[1,2-c]pyrimidine hydrochloride thus obtained melted at 300–301° with decomposition. Recrystallization from a mixture of 100 ml. of ethanol and 70 ml. of methanol gave pure 6 - chloro-3,4-dihydro-9-fluoro-2H-pyrimido[1,2-c]pyrimidine hydrochloride melting at 301–302°.

EXAMPLE 12

*Preparation of 9-fluoro-1,2,3,4-tetrahydro-6H-pyrimido-[1,2-c]pyrimidin-6-one hydrochloride*

The chloroform filtrate and washings from the isolation of crude 6-chloro-3,4-dihydro-9-fluoro-2H-pyrimido-[1,2-c]pyrimidine hydrochloride were evaporated to dryness in vacuo, dissolved in methanol and evaporated again to a pink solid. This material was dissolved in 50 ml. of concentrated hydrochloric acid and heated to reflux. After 3½ hours at reflux temperature, the solution was cooled and stored in a refrigerator for approximately 72 hours. The solution was evaporated to dryness, taken up in 35 ml. of ethanol, filtered and washed with ether. The crude 9-fluoro-1,2,3,4-tetrahydro-6H-pyrimido[1,2-c]pyrimidin-6-one hydrochloride thus isolated melted at 292–294° with decomposition. For purification the crude material was recrystallized from 90 ml. of ethanol. The pure 9-fluoro-1,2,3,4-tetrahydro-6H-pyrimido[1,2-c]pyrimidin-6-one hydrochloride thus obtained melted at 304° with decomposition.

EXAMPLE 13

*Preparation of 2,3-dihydro-8-fluoroimidazo[1,2-c]-pyrimidin-5(1H)-one hydrochloride*

A solution of 10 g. (0.0522 mole) of 2-chloro-4-(2-hydroethyl)amino-5-fluoropyrimidine in 50 ml. of concentrated hydrochloric acid was heated in a boiling water bath for 4 hours. After being cooled in ice, the solution was evaporated to dryness and then dried by being slurried with benzene and reevaporated. The resulting soft white solid was taken up in 100 ml. of thionyl chloride and refluxed for 24 hours. The solution was evaporated in vacuo to an orange solid, taken up in 100 ml. of concentrated hydrochloric acid containing 5 ml. of ethanol and boiled for 40 minutes. After removal of a small amount insoluble residue by filtration, the solution was evaporated to an orange solid. Recrystallization from ethanol-ether gave pure 2,3-dihydro-8-fluoroimidazo[1,2-c]pyrimidin-5(1H)-one hydrochloride melting with decomposition at 304–305°.

EXAMPLE 14

*Preparation of 8-fluoro-2,3-dihydro-1-(3-hydroxypropyl)imidazo[1,2-c]pyrimidin-5(1H)-one*

A solution of 20 g. (0.08 mole) of 3[(2-chloro-5-fluoro-4-pyrimidinyl)(2-hydroxyethyl)amino]-1-propanol in 50 ml. of concentrated hydrochloric acid was heated in a boiling water bath for 4½ hours. Removal of the solvent was accomplished by evaporation in vacuo to a syrup. This syrup was diluted to a volume of 50 ml. with distilled water and the ultraviolet absorption spectrum determined in pH 10.0 buffer solution using a Beckman D. B. Spectrophotometer. The $\lambda_{max}$ found were 220 and 319 m$\mu$; the total absorption at these wavelengths being 549,000 and 975,000 optical density units respectively. Ion-exchange chromatography was then carried out on the aqueous solution using a column 2.5×30 cm. of Dowex 50–X8 H+ form resin (100–200 mesh) with a flow rate of approximately 10 ml. per minute and fractions taken at 15 minute intervals. Fractions 1 to 4 were eluted with distilled water, fractions 5 to 69 with 0.05 N HCl, fractions 70–138 with 0.5 N HCl and fractions 139–145 with 0.5 N NH₄OH. Individual fractions were examined for ultraviolet absorption in pH 10 buffer. Those having the same spectrum were combined and evaporated. Thus, fractions 39–110, all having maxima at 220 and 320 mµ in pH 10 buffer were combined and concentrated to a syrup. This syrup was dissolved in 66 ml. of water. The U.V. spectrum showed a total absorption at 320 mµ of 747,000 in pH 10 buffer. To convert this hydrochloride to the free base, the solution was stirred for 20 minutes with approximately 50 grams of Dowex 50-X8 resin in the H⁺ form. The suspension was filtered and the resin washed with water. The filtrate, which showed an $$E_{320}^{pH\ 10}$$

of 70,000, was discarded. Removal of the base from the resin was accomplished by stirring for 1 hour with 170 ml. of 2 N NH₄OH. After filtration the filtrate $$E_{320}^{pH\ 10} = 435,000$$

was evaporated to a colorless syrup which became solid upon reevaporation with ethanol. Recrystallization from 25 ml. of ethanol gave crude 8-fluoro-2,3-dihydro-1-(3-hydroxypropyl)imidazo[1,2-c]pyrimidin - 5(1H) - one melting at 141–143°. A second recrystallization from ethanol produced pure 8-fluoro-2,3-dihydro-1-(3-hydroxypropyl)imidazo[1,2-c]pyrimidin-5(1H)-one melting at 149–150°.

EXAMPLE 15

*Preparation of 8-fluoro-2,3-dihydro-1-(2-hydroxyethyl) imidazo[1,2-c]pyrimidin-5(1H)-one hydrochloride*

A solution of 17.0 g. (0.0722 mole) of 2-chloro-4-bis (2-hydroxyethyl)amino-5-fluoropyrimidine in 100 ml. of concentrated hydrochloric acid was heated in a boiling water bath for 2 hours. After cooling in ice, the solution was concentrated to a thick syrup which crystallized upon reevaporation with ethanol. Recrystallization from ethanol gave crude 8-fluoro-2,3-dihydro-1-(2-hydroxyethyl)imidazo[1,2-c]pyrimidin - 5(1H) - one hydrochloride melting at 231–234°. A second recrystallization from ethanol gave pure 8-fluoro-2,3-dihydro-1-(2-hydroxyethyl)imidazo[1,2-c]pyrimidin - 5(1H) - one hydrochloride melting at 240–241° decomposition.

EXAMPLE 16

*Preparation of 1-methyl-2,3-dihydro-8-fluoroimidazo [1,2-c]pyrimidin-5(1H)-one hydrochloride*

A solution of 25 g. (0.122 mole) of 2-[N-methyl-(2-chloro-5-fluoro-4-pyrimidinylamino)]ethanol in 100 ml. of concentrated hydrochloric acid was heated in a boiling water bath for 6 hours. After evaporation to a syrup the mixture was cooled in a refrigerator for 72 hours. The resulting crystalline mass was slurried with 50 ml. of isopropanol, filtered, washed with isopropanol and dried. After a second extraction, this time with hot isopropanol, the crude 1 - methyl - 2,3 - dihydro-8-fluoroimidazo[1,2-c]pyrimidin-5(1H)-one hydrochloride melted at 179–184°. For recrystallization, the crude material was dissolved in 32 ml. of boiling methanol and filtered to remove a small amount of insoluble material. Dilution of the filtrate with 100 ml. of acetone caused crystallization. The solid was removed by filtration, washed with acetone and ether and dried in vacuo at 60°. The pure 1 - methyl - 2,3 - dihydro - 8 - fluoroimidazo[1,2-c]pyrimidin-5(1H)-one hydrochloride thus obtained melted at 261–263° with decomposition.

EXAMPLE 17

*Preparation of 2-methyl-5-chloro-8-fluoro-2,3-dihydroimidazo[1,2-c]pyrimidine hydrochloride*

To a suspension of 11.5 g. (0.0563 mole) of 2-chloro-4 - (1 - methyl - 2 - hydroxyethyl)amino - 5 - fluoropyrimidine in 500 ml. of chloroform, there was added 75.5 g. (0.585 mole) of thionyl chloride. The resulting opaque suspension was refluxed overnight. After being cooled to room temperature, the suspension was filtered and the solid washed with chloroform and ether. This crude 2 - methyl - 5 - chloro - 8 - fluoro - 2,3 - dihydroimidazo[1,2-c]pyrimidine hydrochloride melted at 200–201°. After recrystallization from methanol-ether, the white crystalline product melted at 210–212°.

EXAMPLE 18

*Preparation of 2-methyl-8-fluoro-2,3-dihydroimidazo [1,2-c]pyrimidin-5-(1H)one hydrochloride*

A solution of 0.45 g. (0.002 mole) of 2-methyl-5-chloro-8-fluoroimidazo[1,2-c]pyrimidine in 20 ml. of concentrated hydrochloric acid was heated on a steam bath for 2 hours. The solution was then concentrated to a white solid, slurried in ethanol and reevaporated. The resulting crude 2-methyl-8-fluoro-2,3-dihydroimidazo[1,2-c]pyrimidin-5-(1H)one hydrochloride was recrystallized from isopropanol-methanol to give pure material melting at 234–236°.

EXAMPLE 19

*Preparation of 1-(2-chloroethyl)-2,3-dihydro-8-fluoroimidazo[1,2-c]pyrimidin-5(1H)-one hydrochloride*

A solution of 12.0 g. (0.0503 moles) of 2-chloro-4-bis-(2-hydroxyethyl)amino-5-fluoropyrimidine in 50 ml. of thionyl chloride was heated to reflux. After 4 hours at reflux temperature, the mixture was cooled to room temperature, evaporated to a yellow syrup and dissolved in 50 ml. of concentrated hydrochloric acid. After 1 hr. at room temperature the acid solution was heated on a steam bath for 15 minutes, cooled in ice and then evaporated in vacuo to a yellow syrup. Re-evaporation with ethanol gave crude 1-(2-chloroethyl)-2,3-dihydro-8-fluoroimidazo[1,2-c]pyrimidin-5(1H)-one hydrochloride as a crystalline solid. For purification the material was recrystallized from aqueous ethanol. The pure 1-(2-chloroethyl) - 2,3 - dihydro - 8 - fluoroimidazo[1,2-c]pyrimidin-5-(1H)-one hydrochloride thus obtained melted at 227.5–229° with decomposition.

What is claimed is:

1. A compound of the formula

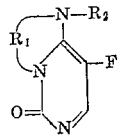

wherein $R_1$ is a member selected from the group consisting of the alkylene radicals —CH₂—CH₂— and

—CH₂—CH₂—CH₂— and the same wherein 1 or more of the hydrogen atoms has been replaced by a lower alkyl group; and $R_2$ is a member selected from the group consisting of hydrogen, lower alkyl, hydroxy lower alkyl, halogeno-lower alkyl and lower alkoxy lower alkyl and pharmaceutically acceptable acid addition salts thereof.

2. A compound of the formula

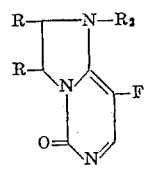

wherein $R_2$ is a member selected from the group consisting of hydrogen, lower alkyl hydroxy lower alkyl, halogeno-lower alkyl and lower alkoxy lower alkyl; and R is a member selected from the group consisting of hydrogen and lower alkyl and pharmaceutically acceptable acid addition salts thereof.

3. A compound of the formula

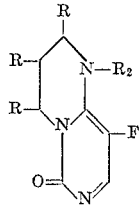

wherein $R_2$ is a member selected from the group consisting of hydrogen, lower alkyl, hydroxy lower alkyl, halogeno-lower alkyl and lower alkoxy lower alkyl; and R is a member selected from the group consisting of hydrogen and lower alkyl and pharmaceutically acceptable salts thereof.

4. A compound of the formula

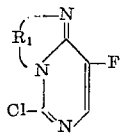

wherein $R_1$ is a member selected from the group consisting of the alkylene radicals —$CH_2$—$CH_2$— and —$CH_2$—$CH_2$—$CH_2$— and the same wherein 1 or more of the hydrogen atoms has been replaced by a lower alkyl group and pharmaceutically acceptable acid addition salts thereof.

5. 1 - methyl - 2,3 - dihydro - 8 - fluoroimidazo[1,2-c]pyrimidin-5(1H)-one hydrochloride.

6. 1 - ethyl - 2,3 - dihydro - 8 - fluoroimidazo[1,2-c]pyrimidin-5(1H)-one hydrochloride.

7. 8 - fluoro - 2,3 - dihydro - 1 - (2 - hydroxyethyl) imidazo[1,2-c]pyrimidin-5(1H)-one hydrochloride.

8. A method which comprises reacting 2,4-dichloro-5-fluoro-pyrimidine with an amino alcohol of the formula

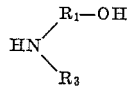

wherein $R_1$ is a member selected from the group consisting of the alkylene radicals —$CH_2$—$CH_2$— and

—$CH_2$—$CH_2$—$CH_2$— and the same wherein 1 or more of the hydrogen atoms has been replaced by a lower alkyl group; and $R_3$ is a member selected from the group consisting of hydrogen, lower alkyl, hydroxy lower alkyl and lower alkoxy lower alkyl to form a compound of the formula

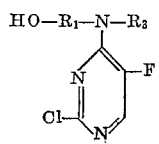

wherein $R_1$ and $R_3$ have the same significance as above and, in a next step, treating with acid to obtain ring closure thereby forming a compound of the formula

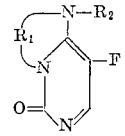

wherein $R_1$ has the same significance as above and $R_2$ is a member selected from the group consisting of hydrogen, lower alkyl, hydroxy lower alkyl and lower alkoxy lower alkyl.

9. A method which comprises reacting 2,4-dichloro-5-fluoro-pyrimidine with an amino alcohol of the formula

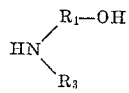

wherein $R_1$ is a member selected from the group consisting of the alkylene radicals —$CH_2$— and

—$CH_2$—$CH_2$— and the same wherein 1 or more of the hydrogen atoms has been replaced by a lower alkyl group; and $R_3$ is a member selected from the group consisting of hydrogen, lower alkyl, hydroxy lower alkyl and lower alkoxy lower alkyl to form a compound of the formula

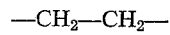
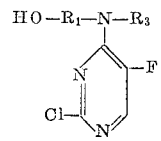

wherein $R_1$ and $R_3$ have the same significance as above and, in a next step, chlorinating and cyclizing the chlorination product by treating with an acid to form a compound of the formula

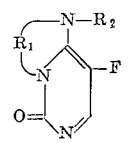

wherein $R_1$ is a member selected from the group consisting of the alkylene radicals —$CH_2$— and

—$CH_2$—$CH_2$— and the same wherein 1 or more of the hydrogen atoms has been replaced by a lower alkyl group; and $R_2$ is halogeno-lower alkyl.

References Cited by the Examiner

Ramage et al.: Jour. Chem. Soc., 1952, pp. 4410–4416.
Ueda et al.: Jour. Amer. Chem. Soc., vol. 85, 1963, pp. 4024–4028.

ALEX MAZEL, *Primary Examiner.*

MARY O'BRIEN, *Assistant Examiner.*